US007478414B1

(12) United States Patent
Glusker et al.

(10) Patent No.: US 7,478,414 B1
(45) Date of Patent: Jan. 13, 2009

(54) METHOD AND APPARATUS FOR ALERTING A TELEVISION VIEWERS TO THE PROGRAMS OTHER VIEWERS ARE WATCHING

(75) Inventors: Sharon F. Glusker, Belmont, CA (US); Stuart Ozer, San Francisco, CA (US); Steven Paul Breyer, Hillsborough, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/567,474

(22) Filed: May 8, 2000

(51) Int. Cl.
*H04H 60/33* (2008.01)
*H04N 7/16* (2006.01)
*H04H 60/32* (2008.01)
*G06F 3/00* (2006.01)

(52) U.S. Cl. .................. 725/9; 715/716; 715/721; 725/16; 725/14

(58) Field of Classification Search ............. 725/9–21, 725/24, 46
See application file for complete search history.

(56) References Cited

U.S. PATENT DOCUMENTS

| | | | |
|---|---|---|---|
| 5,592,470 | A | 1/1997 | Rudrapatna |
| 5,600,573 | A | 2/1997 | Hendricks et al. |
| 5,608,899 | A * | 3/1997 | Li et al. ................. 707/4 |
| 5,758,257 | A | 5/1998 | Herz |
| 5,805,203 | A | 9/1998 | Horton |
| 5,974,299 | A * | 10/1999 | Massetti ................. 725/14 |
| 6,154,463 | A * | 11/2000 | Aggarwal et al. ......... 370/408 |
| 6,312,336 | B1 * | 11/2001 | Handelman et al. ........ 463/40 |
| 6,718,552 | B1 | 4/2004 | Goode |
| 6,754,904 | B1 * | 6/2004 | Cooper et al. ............ 725/32 |
| 6,772,195 | B1 * | 8/2004 | Hatlelid et al. ........... 709/204 |
| 6,774,926 | B1 * | 8/2004 | Ellis et al. ............... 348/14.01 |
| 2001/0049620 | A1 | 12/2001 | Blasko |
| 2002/0053077 | A1 * | 5/2002 | Shah-Nazaroff et al. ... 725/13 |
| 2002/0095676 | A1 | 7/2002 | Knee |
| 2002/0112239 | A1 | 8/2002 | Goldman |
| 2002/0144266 | A1 | 10/2002 | Goldman |

(Continued)

FOREIGN PATENT DOCUMENTS

JP     10248020 A  *  9/1998

(Continued)

OTHER PUBLICATIONS

"Pie Chart" definition from Internet Archive of www.whatis.com (Sep. 2000).*

(Continued)

*Primary Examiner*—Christopher Kelley
*Assistant Examiner*—Usha Raman
(74) *Attorney, Agent, or Firm*—Workman Nydegger (57) ABSTRACT

Described are methods and apparatus that allow viewers to access timely data showing what other viewers are watching at (or near) a given moment. Thus, for example, a viewer could tune in, find out which ten programs currently being broadcast are most popular, and then select from among these programs. In one embodiment, the data is displayed with links to those popular programs so viewers can easily tune to listed programs. In another embodiment, the viewer can identify a group of friends and find out what those friends are watching. The viewer could then tune into one of the programs his or her friends are watching, and so be prepared to discuss that program later.

38 Claims, 3 Drawing Sheets

U.S. PATENT DOCUMENTS

| | | |
|---|---|---|
| 2003/0056208 A1* | 3/2003 | Kamada et al. ............... 725/9 |
| 2003/0088872 A1* | 5/2003 | Maissel et al. ............... 725/46 |
| 2003/0115585 A1 | 6/2003 | Barsness |
| 2003/0145323 A1* | 7/2003 | Hendricks et al. ............ 725/34 |
| 2005/0071882 A1 | 3/2005 | Rodriguez et al. |
| 2005/0149964 A1* | 7/2005 | Thomas et al. ............... 725/9 |
| 2005/0262542 A1* | 11/2005 | DeWeese et al. ............ 725/106 |

FOREIGN PATENT DOCUMENTS

| | | | |
|---|---|---|---|
| WO | WO 99/45700 | | 9/1999 |
| WO | WO 00/13416 | * | 3/2000 |
| WO | WO0027124 A | | 5/2000 |

OTHER PUBLICATIONS

R. Panabaker, S. Wegerif, and D. Zigmond, "The Transmission of IP Over the Vertical Blanking Interval of a Television Signal," (Feb. 1999).

Advanced Television Enhancement Forum Specification (ATVEF), Version 1.1 revision 26, (Feb. 2, 1999).

"How the Internet Works," Preston Gralla (1999), chapter 20.

Electronic Industries Association EIA-746A, "Transport of Internet Uniform Resource Locator (URL) Information Using Text-2 (T-2) Service" (Sep. 1998).

S. Deering, "Host Extensions for IP Multicasting" (Aug. 1989).

J. Postel, "User Datagram Protocol," (Aug. 1980), identified as page "ftp://ftp.isi.edu/in-notes/rfc768.txt".

* cited by examiner

METHOD AND APPARATUS FOR ALERTING A TELEVISION VIEWERS TO THE PROGRAMS OTHER VIEWERS ARE WATCHING

BACKGROUND OF THE INVENTION

The Internet is a worldwide collection of networks and gateways. The Internet includes a backbone of high-speed communication lines between major nodes, consisting of thousands of commercial, government, educational, and other computer systems. The WorldWide Web (the Web) is a collection of formatted hypertext pages—located on numerous computer systems around the world—that are logically connected by the Internet.

Web browsers provide user interfaces to the Web, allowing individuals to access Internet content from personal computers. Internet terminals, such as those pioneered by WebTV Networks, Inc., have made the Web more accessible by eliminating the need for a personal computer. Instead, Internet terminals, or "set-top boxes," provide Web access using an ordinary television (TV) set as a display and a remote control or wireless keyboard for user (e.g., viewer) input.

Figure 1:
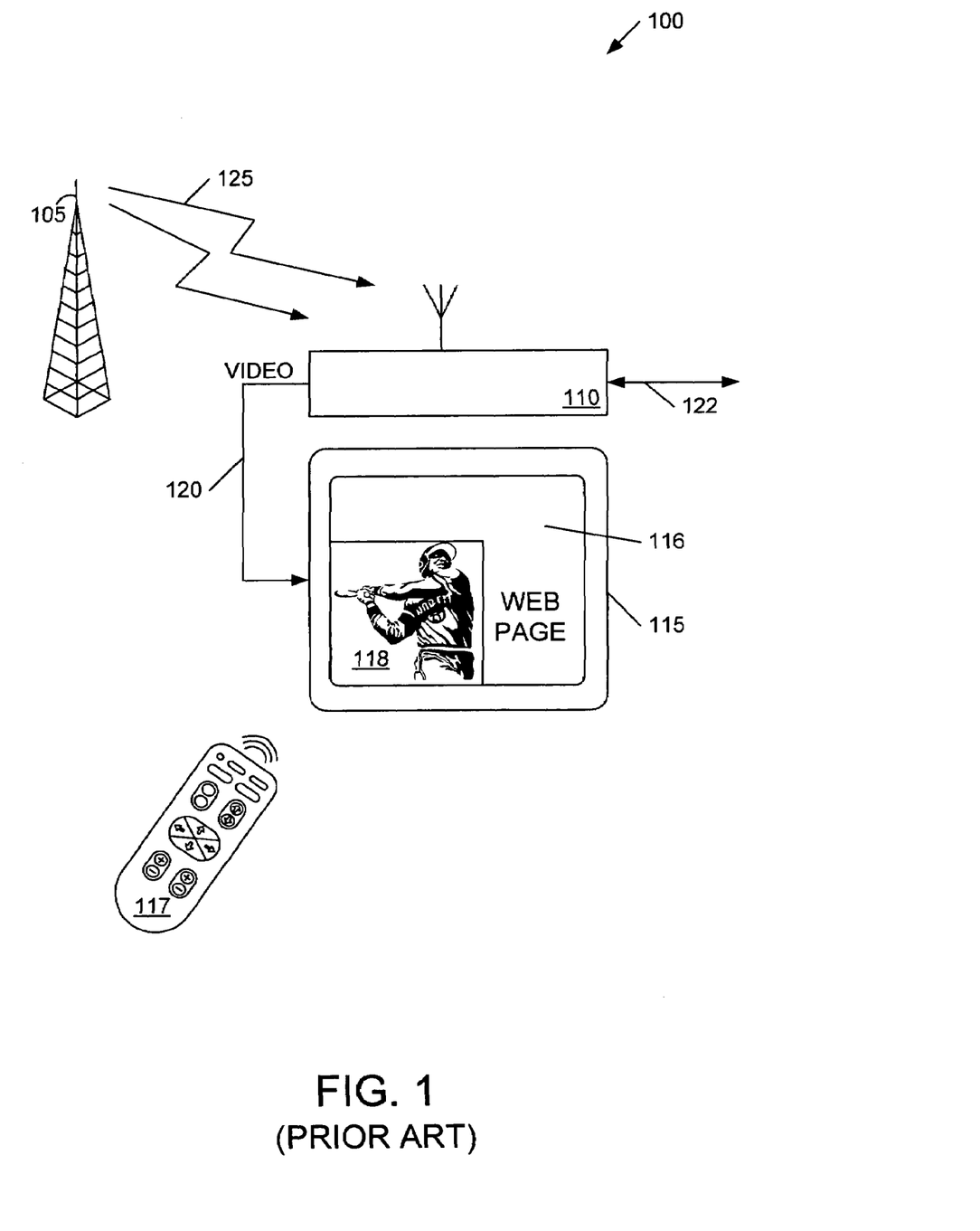
FIG. 1 illustrates a conventional interactive television system 100 that includes a broadcast source 105, a set-top box 110, an ordinary analog television set 115, and a remote control 117.

FIG. 1 illustrates a conventional interactive television system 100 that includes a broadcast source 105, a set-top box 110, an ordinary analog television set 115, and a remote control 117. Set-top box 110 and television set 115 collectively form a receiver, and may be integrated. Television set 115 displays video data, including a graphical user interface 116 and broadcast video 118, conveyed from set-top box 110 by a video link 120. Video link 120 is an RF (radio frequency), S-video, composite video, or other video link. Set-top box 110 includes a network connection 122 to the Internet. Connection 122 is typically accomplished using a telephone or cable modem, but other schemes are also possible.

Set-top box 110 includes hardware and software for receiving and decoding a broadcast video signal 125, and for providing video data to television set 115 via video link 120. Set-top box 110 also includes hardware and software for providing a viewer with graphical user interface 116, capable of displaying both Web content (e.g., HTML or XML pages) and broadcast video. A viewer operates remote control 117 to control set-top box 110 to display broadcast TV, browse the Web, and send or receive e-mail. Viewers may also control set-top box 110 using a keyboard (not shown).

Choosing from among tens or even hundreds of broadcast television programs can be daunting. Viewers typically attempt to find interesting programs by flipping through channels; unfortunately, this practice is time consuming and often annoys other viewers who happen to be watching the same television. There is therefore a need for a means of more quickly locating programs of interest.

The program a viewer is most interested in watching is often one that he or she missed. For example, a viewer might feel excluded when friends or coworkers are excitedly discussing a program the viewer missed the night before. Such a viewer would benefit from a system that would alert him or her to programs that friends or coworkers are watching so that the viewer would be prepared to engage in the next day's discussion.

SUMMARY

The present invention allows viewers to access timely data showing what other viewers are watching at (or near) a given moment. Thus, for example, a viewer could tune in, find out which ten programs currently being broadcast are most popular, and then select from among these programs. In one embodiment, the data is displayed with links to those popular programs so that viewers can easily tune to listed programs. In another embodiment, the viewer can identify a group of friends and find out what those friends are watching. The viewer could then tune into one of the programs his or her friends are watching, and so be prepared to discuss that program later.

This summary does not purport to define the invention. The invention is defined by the claims.

DETAILED DESCRIPTION

Figure 2:
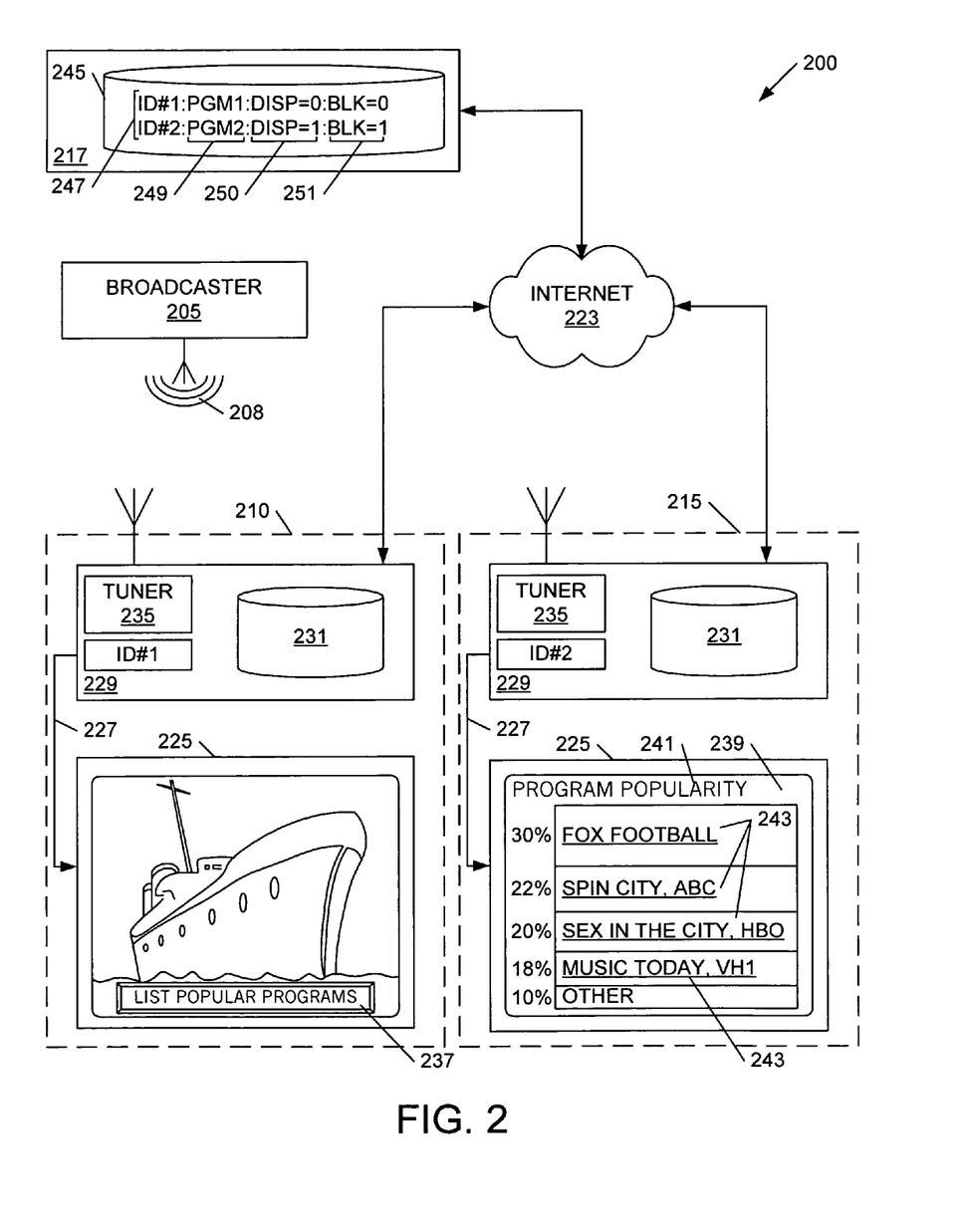
FIG. 2 depicts a communication system 200 configured, in accordance with the invention, to poll viewers to determine what television programs they are watching and to present this data to interested viewers.

FIG. 2 depicts a communication system 200 configured, in accordance with the invention, to poll viewers to determine what television programs they are watching and to present this data to interested viewers. System 200 provides viewers timely data showing what other viewers are watching at or near a given moment, allowing viewers to select a program based on popularity.

System 200 includes a broadcaster 205 broadcasting a video signal 208 to a number of receivers. Two exemplary receivers 210 and 215 are shown. Receivers 210 and 215 communicate with a remote server 217 via respective bi-directional network connections 219 and 221 and the Internet 223. Internet 223 is understood to include all required modems, lines, and other components. Server 217 collects data about the viewing habits of receivers 210 and 215 and makes this data available to each of receivers 210 and 215 upon request.

Each of receivers 210 and 215 includes a television set 225 connected via a video line 227 to a set-top box 229 similar to set-top box 110 of FIG. 1. In each receiver, television set 225 and set-top box 229 work together to display Web pages, broadcast television, or both. Web pages are typically downloaded over the Internet 223, but may also be received via video signal 208 or retrieved from a local memory, such as a disk drive 231 in each set-top box 229. Set-top box 229 stores Web pages locally in each case.

Each set-top box 229 is manufactured to include a unique identifier, which set-top box 229 uses to authenticate itself when communicating with other network devices, such as server 217. The unique identifiers associated with receivers 210 and 215 are labeled ID#1 and ID#2, respectively. For more information about receivers for use in the present invention, see U.S. patent application Ser. No. 09/295,436 entitled "Receiving an Information Resource From the Internet if it is Not Received From a Broadcast Channel," by Zigmond et al., filed Apr. 20, 1999 (MS-129982.1), and U.S. patent application Ser. No. 09/107,083 entitled "Web Browser System For Displaying Recently Viewed Television Channels," by Christopher M. White, filed Jun. 29, 1998 (MS-112624), which are incorporated herein by reference.

Video signal 208 simultaneously conveys a number of different television programs. Each of set-top boxes 229 includes a local tuner 235 that tunes into one of these programs for display on television 225. The tuners in each receiver may be tuned to the same or different programs. For illustrative purposes, receiver 210 depicts a broadcast television commercial sponsored by a cruise line.

In accordance with the invention, receiver 210 displays a link 237 offering the viewer of receiver 210 the option of viewing a list of the most popular programs currently being broadcast via video signal 208. Selecting link 237, with a pointing device for example, causes television 225 to display a graphic 239 listing the most popular programs. Television 225 of receiver 215 is shown displaying such a graphic 239 as a portion of a Web page.

Graphic 239 includes some text 241 specifying the nature of graphic 239. Graphic 239 also includes a series of links 243, conventionally illustrated as underlined text, that a viewer may select to view the identified television program. Each link 243 may include a uniform resource identifier (URI) unique to a given broadcast channel. In one embodiment, each link has an associated number identifying the percentage of viewers watching the program. In the depicted embodiment, for example, 30% of television viewers are tuned into a broadcast football game carried by the Fox television network. The text associated with the 10% of programs listed as "other" does not include a link; in other embodiments, however, the "other" might include a link to a list of/programs within the 10%. For a more detailed discussion of links to broadcast television, see U.S. patent application Ser. No. 09/467,764 entitled "Document Data Structure and Method of Integrating Broadcast Television with Web Pages," by D. J. Zigmond et al., filed Dec. 20, 1999 (MS-130685.1), which is incorporated herein by reference.

Server 217 cannot provide a list of popular shows without first determining which programs viewers are watching. Each of receivers 210 and 215 therefore periodically prepares a log message identifying the respective receiver and the program to which the receiver is tuned. Receivers 210 and 215 then push these log messages to server 217 via the Internet 223 using the conventional TCP/IP communication protocol.

Each log message is directed to an address within server 217. The log messages include the unique identifier of the respective receiver (e.g., unique identifier ID#1 of receiver 210) and data reporting the program to which the receiver is tuned. In one embodiment, the unique identifier is a subscriber ID assigned to a subscriber of the WebTV™ service provided by WebTV Networks Inc., of Mountain View, Calif. WebTV is a registered trademark of WebTV Networks, Inc.

Television networks are not shown on the same numerical channel in every geographic location, and television programs are not shown at the same time in every geographic location. One embodiment of the invention therefore uses a conventional electronic programming guide (EPG) implemented on receivers 210 and 215 to report the identity of watched programs. Conventional EPGs include a database that maps broadcast programs to network stations using knowledge of the viewer's zip code and the viewer's local cable provider. EPGs correlate programs and broadcast times, each program having a corresponding unique program identifier. Receivers 210 and 215 can therefore use the EPG and the broadcast channel to which the receiver is tuned to ascertain the program identifier for a watched program. The log message to server 217 includes the program identifier and the subscriber ID for the receiver. In other embodiments, the message also includes a time value indicating the present time at the receiver, the time zone in which the receiver is located, and information identifying the broadcast station to which the receiver is tuned. One embodiment depicts each program's popularity as an icon or a collection of icons associated with a program listing of an EPG. For example, one or more stars might follow a program listing, the number of stars being correlated to program popularity.

Server 217 includes a database 245 with database entries 247 associated with each reporting receiver. In the present example, database entries 247 include the unique identifiers ID#1 and ID#2 associated with receivers 210 and 215, respectively. Server 217 records the program data from the reporting receivers in database fields 250 associated with the unique identifiers of the reporting receivers. Server 217 compiles the program data from all or a selected subset of the reporting receivers—using well-known statistical methods—to rank the broadcast programs by the number of the receivers that are tuned to those programs. Server 217 then forwards this information to those viewers who previously requested program popularity data by selecting link 237. In another embodiment, server 217 conveys the information to broadcaster 205 to be broadcast in a communication channel of video signal 208. In that embodiment, selecting link 237 instructs the associated receiver to display the contents of the periodic messages from server 217. Such messages would typically be formatted as trigger messages, such as those described in "Advanced Television Enhancement Forum Specification" (ATVEF), Version 1.1 revision 26, (Feb. 2, 1999), which is incorporated herein by reference.

Not all viewers will be interested in program popularity. Thus, database 245 includes a field 250 associated with each listed receiver that indicates whether the receiver has requested that program popularity be displayed. In the depicted embodiment, a zero in field 250 indicates that the corresponding receiver should not receive messages containing program popularity data, whereas a logical one indicates that the corresponding receiver should receive such data. Viewers select link 237 to change the contents of field 250 from a zero to a one. Another link (not shown) allows viewers to return the contents of field 250 to zero. Alternatively, a single link may be used to toggle between the two modes. Once field 250 is set to one, server 217 periodically sends messages updating listing 239 until the viewers elects to turn off listing 239. Alternatively, broadcaster 205 could broadcast popularity data as trigger messages. The individual receivers can then be configured to display or ignore these messages, depending upon the viewer's interest.

Collecting data from a large number of receivers can be burdensome. Thus, server 217 only collects data from a subset of receivers in some embodiments of the invention. In one embodiment, for example, server 217 maintains a list of receiver identifiers with which server 217 communicates. Server 217 then selects a random, statistically meaningful sampling of receivers from among those listed and requests the selected receivers periodically send the above-described messages reporting the watched program. In one embodiment, receivers send these messages every ten minutes throughout the day. In other embodiments, receivers only send these messages once upon tuning into a given channel. In still other embodiments, receivers only send one message after tuning into a given channel, but such message can only be sent if viewers remain tuned into the given channel for a specified time period, such as one minute. This last embodiment avoids unnecessary messages that might be initiated by "channel surfing," and further avoids reporting a show as being watched when a viewer merely skips through the show before settling upon another.

Figure 3:
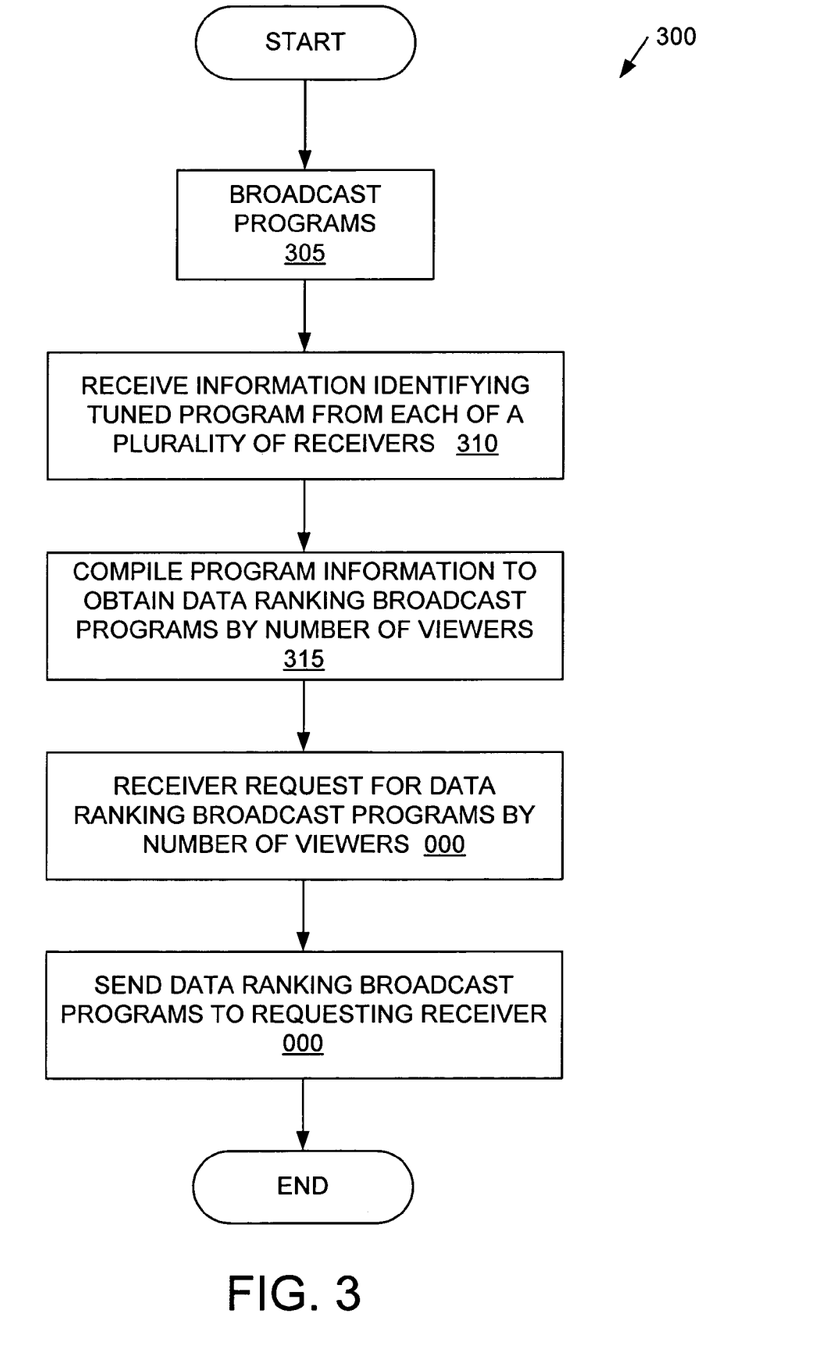
FIG. 3 is a flowchart 300 depicting a method employed by an Internet Service Provider (ISP) working in conjunction with a television broadcaster to collect and distribute information identifying popular television programs.

FIG. 3 is a flowchart 300 depicting a method employed by an Internet Service Provider (ISP) working in conjunction with a television broadcaster to collect and distribute information identifying popular television programs. This method is described in connection with system 200 of FIG. 2.

The process begins with broadcaster 205 simultaneously broadcasting a number of programs (step 305). Step 305 is not really a step in the method, as broadcasters generally broadcast programs continuously. Each receiver tuned into one of the programs periodically sends a message to server 217 reporting the channel to which the receiver is tuned (step 310). In an embodiment in which only a subset of receivers report this channel information, server 217 sends a message to each of the subset of receivers instructing them to periodically report the channel information.

Database 245 of server 217 maintains a list of receiver identifiers and corresponding information identifying the channel to which each receiver is tuned. Server 217 compiles this information to create a list of the most popular television programs, where popularity is a function of the number of receivers currently tuned to a program (step 315). This list may rank all programs, or may be limited to e.g. the top ten. Server 217 is programmed with software instructions for compiling and periodically updating this list.

In one embodiment, server 217 ignores data that is so old that it likely results from an active tuner connected to a television that is either off or not being watched. As it is unlikely that a viewer will remain tuned to a single channel for more than, e.g., two hours without at least referring to the EPG or changing the channel during commercials, one embodiment does not use information associated with log messages more than two hours old to calculate program popularity. In one embodiment, receivers configured to display program popularity data periodically send a request for updated data. Messages used to report the channel being watched can also convey the request for popularity data. Server 217 receives these requests over the Internet 223 (step 300) and responds by providing the list of popular programs to requesting receivers (step 315). In another embodiment, server 217 conveys the list of popular programs to broadcaster 205 to be broadcast with video signal 208. Receivers can then be configured, as desired, to either display or ignore the list.

Server 217 can be adapted to enable viewers to find out what show or shows their friends (or some other defined group) are watching. Viewers (or other entities) can define viewer groups of individuals selected from database 245. Individuals from a viewer group can then join or quit the group, as desired. Where privacy is a concern, joining a group requires some form of permission from members of the group and/or from the entity that set up the group. In an alternative embodiment of the invention, server 217 can provide program popularity data obtained from commercial rating companies or other sources, such as Nielsen Media Research of New York. There may be disadvantages, however, to such an approach, including that the data may not be as timely and that it may be more interesting to users of the system to see what their peers are watching as opposed to the general population.

If the receivers associated with a given viewer group are not among those receivers being monitored, then the receiver identifiers associated with the members of the viewer group are added to the subset of receivers being monitored. The reported program identifier periodically supplied from each member's receiver is then stored in database 245 at a location associated with the group. Lists of the programs to which the listed viewers are tuned are then periodically pushed to any requesting members of the group. Alternatively, receivers assigned to members of the group can pull the list of programs from database 245 either periodically or when prompted by the member. For large groups of friends, server 217 may compile the reported program identifiers from the group members so that the list is limited to the most popular television programs selected from among those to which the members are tuned.

In some embodiments, broadcasters seek permission from viewers to record and store demographic information characterizing those viewers. Maintaining such information allows broadcasters to determine what programs might be of interest to participating viewers. In one such embodiment, database 245 includes fields for recording demographic information related to each participating viewer. Such data can include age, income, education, political party, sex, areas of interest, and program preferences, to name just a few. Such data can also be geographic, identifying such areas as time zone, city, county, or state. This information can then be used to determine the popularity of broadcast programs among certain viewer populations. A viewer might request, for example, a list of shows most popular among democrats, women, Californians, or women democrats in California. Database 245 might also include a field for recording the television signal provider (e.g., a cable or satellite company) for each participating viewer. Thus, popularity reports can be limited to shows available to an interested viewer.

In one embodiment, viewers can sign up to be notified immediately if a selected group member changes channels. For example, one member might be notified when a friend switches to a different program. Receivers only send log messages if the viewers remain tuned into the given channel for a specified time period—such as one minute—to avoid unnecessary messages that might be initiated by "channel surfing," and further avoids reporting a show as being watched when a viewer merely skips through the show before settling upon another.

Some viewers may not want others to know what they are watching. Thus, one embodiment of the invention allows viewers to configure their receivers to block messages that report their viewing habits. Alternatively, server 217 can be configured to collect data representing the viewing behavior of some viewers for statistical purposes without making data particular to a unique receiver available to other viewers. In one such embodiment, database 245 includes a "block" field 251 (FIG. 2) that allows viewers to find out what another viewer is watching only if the value is set to zero.

Various companies, such as Microsoft and America Online, offer instant-messaging services that allow people connected to the Internet to send instant messages to one another. Instant messaging systems typically allow a user to receive a message alerting him or her that a friend is currently connected to the Internet. In a typical example, each client creates a list of friends, or "buddies." Then, when the client connects to the Internet, a server communicates with the client to determine whether any of the listed friends are also connected to the Internet; if so, the server notifies the client. The server periodically checks for friends and announces their presence should they log on. For a more detailed discussion of how instant messaging works, see chapter 20 of "How the Internet Works," by Preston Gralla (1999), which is incorporated herein by reference.

One embodiment of the invention is adapted for use with instant messaging. Client receivers connect to a dedicated server that handles instant messaging. When a viewer logs on to the server, the receiver sends a list of friends to the server. The server notes that the viewer is logged on and checks to see whether any of the listed friends are logged on. The server then periodically checks viewing status of the listed friends and notifies the viewer.

In adapting the invention to instant messaging, viewers listed as friends by a selected viewer in a given receiver supply the server with information describing the channel to which the viewer is tuned. Thus, the server not only notifies the selected viewer when friends are connected, but also tells the viewer what channel his or her friends are watching. Moreover, each participating receiver in a list of friends notifies the server that the respective viewer has changed channels, as discussed above in connection with other embodiments, so that the server remains apprised of the channels that the various viewers are watching. Extending the instant-messaging server to support the additional variables required for adaptation to the present invention will be within the ability of those of skill in the art in light of the foregoing disclosure.

The server and receivers described above as embodying the present invention each include at least one general-purpose or special-purpose processor programmed with instructions to perform the various steps of the above-described methods. Alternatively, the steps of the present invention might be performed by specific hardware components that contain hardwired logic for performing the steps, or by any combination of programmed computer components and custom hardware components.

While the invention is described in the context of viewing Web content on an Internet terminal system, such as the WebTV® Internet terminal, the method and apparatus described herein have equal application to various other TV viewing devices, such as personal computers equipped with TV tuners, and the like. Moreover, various implementations may employ an NTSC broadcast video signals or other broadcast TV systems, such as Phase Alternate Lines (PAL), Sequential Couleur Avec Memoire (SECAM), and the proposed High Definition Television (HDTV) standard. And, a variety of other transport mechanisms may be employed, including digital satellite, digital TV, and cable TV. Accordingly, various modifications, adaptations, and combinations of various features of the described embodiments can be practiced without departing from the scope of the invention as set forth in the claims.

What is claimed is:

1. In a broadcast system, a method for identifying programs of interest to a viewer in a group that includes other viewers based on the programming being currently viewed by the group of viewers, the method comprising:
    simultaneously broadcasting a plurality of programs to a plurality of receivers, each receiver of the plurality of receivers being tuned into at least one of the plurality of programs;
    receiving, from at least one receiver of the plurality of receivers, input for defining a viewer group, wherein the viewer group is defined by a viewer selecting individuals from a database having information corresponding to one or more of the plurality of receivers;
    receiving, from each of the one or more receivers corresponding to the group, information identifying a program to which each of the receivers of the group is currently tuned;
    compiling the information from each of the receivers corresponding to the group to obtain ranking data that ranks at least one of the plurality of programs by a number of the receivers of the group that are currently tuned to the at least one program to calculate a relative popularity of programs currently tuned to by the receivers in the group, wherein ranking data is a function of number of receivers in the group tuned to the specified program and excludes the viewership of the general population and wherein said compiling includes ignoring information received from the receivers of the group that is older than a predetermined time;
    for at least one of the receivers of the group, determining whether an update should be sent to the at least one receiver based at least in part on a stored field value at a remote server corresponding to the at least one receiver, wherein the stored field value is modifiable by the at least one receiver; and
    sending the ranking data to the at least one receiver when it is determined that an update should be sent according to the stored field value, and wherein the ranking data identifies programs to which receivers of the group are currently tuned;
        wherein at least one receiver of the group, which receives the ranking data, displays a selectable link on a display simultaneously with a display of a program that is currently tuned to by the at least one receiver, wherein the selectable link is linked to a first list of programs that are currently being broadcast and that have been calculated as being the most popular programs being viewed by the group of receivers, and
        upon subsequently receiving user input selecting the displayed link, displaying the first list of programs that have been calculated as being the most popular in the viewer group, wherein at least one program displayed in the first list of programs is displayed as a selectable link in the first list for directly accessing said at least one program and wherein each program displayed in the first list of programs is displayed by program title and wherein the first list of programs is further displayed with at least one other category listing that is identified by a name other than a program title, and wherein the at least one other category listing comprises a link to a second list of other programs that are determined to be of a lower popularity than programs that are listed by title in the first list of programs.

2. The method of claim 1, wherein the information identifying the program to which the receivers are tuned comprises unique program identifier information.

3. The method of claim 1, wherein the information identifying the program to which the receivers are tuned comprises a time value and a number corresponding to a carrier frequency of the program.

4. The method of claim 1, wherein compiling the information comprises counting ones of the receivers tuned to the at least one of the plurality of programs.

5. The method of claim 1, further comprising, before sending the ranking data, receiving a request for the ranking data from the at least one receiver.

6. The method of claim 1, further comprising periodically sending updates of the ranking data to the at least one receiver.

7. The method of claim 6, wherein the updates are sent at least twenty times per day.

8. The method of claim 1, wherein the link is displayed with programming tuned to by the at least one receiver.

9. The method of claim 8, wherein the link comprises a URI.

10. The method of claim 1, further comprising receiving, from the at least one of the receivers, a list of viewer identifiers corresponding to a second plurality of receivers.

11. The method of claim 1, wherein the first list of programs lists the plurality of programs by ordered popularity, the ordered popularity of a particular program being a function of the number of the receivers tuned to the specified program.

12. The method of claim 1, wherein the group of receivers comprises a subset of a plurality of total receivers that are selected from the plurality of total receivers based on demographic data.

13. The method of claim 12, further comprising receiving the demographic data from the at least one receiver before sending the ranking data.

14. A method as recited in claim 1, wherein the method further comprises:
receiving a log message created by the at least one receiver that identifies the programs to which the at least one receiver is tuned;
receive a request for information ranking programs by popularity to which other members of the group are currently tuned;
receive an indication whether updates of the information should be sent to the receiver.

15. The method of claim 14, wherein the log message identifies a zip code indicating a geographical area in which the receiver is located.

16. The method of claim 14, wherein the log message is sent a specified time after the at least one receiver tunes to a program to which the receiver is tuned.

17. The method of claim 16, wherein the specified time is greater than one minute.

18. The method of claim 16, wherein the method includes ignoring information conveyed in the log message when the log message is older than a particular time period.

19. The method of claim 18, wherein the particular time period is over two hours.

20. A method as recited in claim 1, wherein ranking data is only sent to receivers that have first requested the ranking data.

21. A method as recited in claim 1, the method further including:
receiving a specific request from at least one receiver from the subset of receivers to be notified when a particular receiver within the group tunes to a different channel.

22. A method as recited in claim 1, the method further including:
notifying said at least one receiver when the different receiver in the group tunes to a different channel.

23. A method as recited in claim 1, wherein the method further includes a particular viewer joining the group and wherein the particular viewer joining the group requires the permission from at least one member associated with the group.

24. A method as recited in claim 23, wherein the at least one member, for which permission is required, comprises the viewer that defined the group.

25. A method as recited in claim 1, wherein the first list of programs includes a plurality of programs displayed with relative popularity data, including one or more of percentage information and icons, that reflect the relative popularity of programs currently tuned to by the receivers in the group.

26. A method as recited in claim 1, wherein the first list of programs being displayed is displayed with an identification of a percentage of viewers viewing each program listed in the first list of programs and wherein a total percentage, comprising a sum of all reflected percentages displayed in the first list, totals 100 percent.

27. A method as recited in claim 26, wherein the at least one other category listing that refrains from including any program title is displayed with a corresponding cumulative percentage of viewers tuned to programs that are determined to be of the lower popularity, the cumulative percentage being part of the 100 percent total reflected in the first list of programs.

28. A method as recited in claim 1, wherein each program displayed in the first list of programs is displayed as a selectable link for directly accessing each corresponding program.

29. A method as recited in claim 27, wherein the cumulative percentage of viewers tuned to programs that are determined to be of the lower popularity is ten percent or less.

30. A method as recited in claim 1, wherein the method further includes modifying an EPG to display stars next to programs that reflect program popularity based on the percentage of viewers tuned to the programs.

31. A method as recited in claim 1, wherein the log message is only sent a single time for each time a viewer tunes the at least one receiver to a particular program and only a specified period of time after the at least one receiver is tuned to the particular program.

32. A method as recited in claim 1, wherein the method further includes receiving information a viewer has signed up to receive special notifications identifying channel changes by a particular identified friend and providing the special notifications when the particular identified friend changes channels and only when the friend remains tuned to a new channel for at least a predetermined period of time.

33. The method of claim 32, wherein the predetermined period of time is at least one minute.

34. A computer-readable storage medium encoding computer-executable instructions for performing a method that includes:
simultaneously broadcasting a plurality of programs to a plurality of receivers, each receiver of the plurality of receivers being tuned into at least one of the plurality of programs;
receiving, from at least one receiver of the plurality of receivers, input for defining a viewer group, wherein the viewer group is defined by a viewer selecting individuals from a database having information corresponding to one or more of the plurality of receivers;
receiving, from each of the one or more receivers corresponding to the group, information identifying a program to which each of the receivers of the group is currently tuned;
compiling the information from each of the receivers corresponding to the group to obtain ranking data that ranks at least one of the plurality of programs by a number of the receivers of the group that are currently tuned to the at least one program to calculate a relative popularity of programs currently tuned to by the receivers in the group, wherein ranking data is a function of number of receivers in the group tuned to the specified program and excludes the viewership of the general population and wherein said compiling includes ignoring information received from the receivers of the group that is older than a predetermined time;
for at least one of the receivers of the group, determining whether an update should be sent to the at least one receiver based at least in part on a stored field value at a remote server corresponding to the at least one receiver, wherein the stored field value is modifiable by the at least one receiver; and
sending the ranking data to the at least one receiver when it is determined that an update should be sent according to the stored field value, and wherein the ranking data identifies programs to which receivers of the group are currently tuned;

wherein at least one receiver of the group, which receives the ranking data, displays a selectable link on a display simultaneously with a display of a program that is currently tuned to by the at least one receiver, wherein the selectable link is linked to a first list of programs that are currently being broadcast and that have been calculated as being the most popular programs being viewed by the group of receivers, and upon subsequently receiving user input selecting the displayed link, displaying the first list of programs that have been calculated as being the most popular in the viewer group, wherein at least one program displayed in the first list of programs is displayed as a selectable link in the first list for directly accessing said at least one program and wherein each program displayed in the first list of programs is displayed by program title and wherein the first list of programs is further displayed with at least one other category listing that is identified by a name other than a program title, and wherein the at least one other category listing comprises a link to a second list of other programs that are determined to be of a lower popularity than programs that are listed by title in the first list of programs.

35. The computer-readable storage medium of claim 34, wherein the information identifying the program to which the receiver is tuned comprises a unique program identifier.

36. The computer-readable storage medium of claim 34, wherein the information identifying the program to which the receiver is tuned comprises at least one of a time value and a number corresponding to a carrier frequency of the program.

37. The computer-readable storage medium of claim 34, wherein compiling the information comprises counting ones of the receivers tuned to the at least one of the plurality of programs.

38. A computing system apparatus comprising a processor and memory storing computer-executable instructions that, when executed by the processor, implement a method that includes:

simultaneously broadcasting a plurality of programs to a plurality of receivers, each receiver of the plurality of receivers being tuned into at least one of the plurality of programs;

receiving, from at least one receiver of the plurality of receivers, input for defining a viewer group that is defined by a viewer selecting individuals from a database having information corresponding to one or more of the plurality of receivers;

receiving, from each of the one or more receivers corresponding to the group, information identifying a program to which each of the receivers of the group is currently tuned;

compiling the information from each of the receivers corresponding to the group to obtain ranking data that ranks at least one of the plurality of programs by a number of the receivers of the group that are currently tuned to the at least one program to calculate a relative popularity of programs currently tuned to by the receivers in the group, wherein ranking data is a function of number of receivers in the group tuned to the specified program and excludes the viewership of the general population and wherein said compiling includes ignoring information received from the receivers of the group that is older than a predetermined time;

for at least one of the receivers of the group, determining whether an update should be sent to the at least one receiver based at least in part on a stored field value at a remote server corresponding to the at least one receiver, wherein the stored field value is modifiable by the at least one receiver; and sending the ranking data to the at least one receiver when it is determined that an update should be sent according to the stored field value, and wherein the ranking data identifies programs to which receivers of the group are currently tuned;

wherein at least one receiver of the group, which receives the ranking data, displays a selectable link on a display simultaneously with a display of a program that is currently tuned to by the at least one receiver, wherein the selectable link is linked to a first list of programs that are currently being broadcast and that have been calculated as being the most popular programs being viewed by the group of receivers, and upon subsequently receiving user input selecting the displayed link, displaying the first list of programs that have been calculated as being the most popular in the viewer group, wherein at least one program displayed in the first list of programs is displayed as a selectable link in the first list for directly accessing said at least one program and wherein each program displayed in the first list of programs is displayed by program title and wherein the first list of programs is further displayed with at least one other category listing that is identified by a name other than a program title, and wherein the at least one other category listing comprises a link to a second list of other programs that are determined to be of a lower popularity than programs that are listed by title in the first list of programs.

* * * * *

UNITED STATES PATENT AND TRADEMARK OFFICE
CERTIFICATE OF CORRECTION

| | | |
|---|---|---|
| PATENT NO. | : 7,478,414 B1 | |
| APPLICATION NO. | : 09/567474 | |
| DATED | : January 13, 2009 | |
| INVENTOR(S) | : Sharon F. Glusker et al. | |

It is certified that error appears in the above-identified patent and that said Letters Patent is hereby corrected as shown below:

Title Pg, Item (54), under "Title" before "TELEVISION" delete "A".

In column 1, line 2, before "TELEVISION" delete "A".

Signed and Sealed this
Third Day of May, 2011

David J. Kappos
*Director of the United States Patent and Trademark Office*